United States Patent
Aydemir et al.

(10) Patent No.: US 6,771,652 B1
(45) Date of Patent: Aug. 3, 2004

(54) METHOD AND SYSTEM FOR CONTROLLING TRANSMISSION OF PACKETS IN COMPUTER NETWORKS

(75) Inventors: Metin Aydemir, Durham, NC (US); Brian Mitchell Bass, Apex, NC (US); Clark Debs Jeffries, Durham, NC (US); Sonia Kiang Rovner, Chapel Hill, NC (US); Michael Steven Siegel, Raleigh, NC (US); Anthony Matteo Gallo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,380

(22) Filed: Nov. 23, 1999

(51) Int. Cl.[7] .......................... H04L 12/56; H04L 12/28
(52) U.S. Cl. ........................ 370/412; 370/235; 370/232
(58) Field of Search ................................ 370/412, 413, 370/414, 415, 416, 417, 418, 428, 429, 229, 230, 230.1, 232, 233–235, 235.1, 236, 236.1, 236.2, 252, 253, 352, 353, 356, 389, 395.1, 395.21, 395.4, 395.7, 395.71, 395.72, 400, 401

(56) References Cited

U.S. PATENT DOCUMENTS

| | | | |
|---|---|---|---|
| 5,231,633 A | 7/1993 | Hluchyj et al. | 370/429 |
| 5,278,830 A | 1/1994 | Kudo | 370/232 |
| 5,650,993 A | 7/1997 | Lakshman et al. | 370/236 |
| 5,732,087 A | 3/1998 | Lauer et al. | 370/416 |
| 5,748,901 A | 5/1998 | Afek et al. | 709/238 |
| 5,764,641 A | 6/1998 | Lin | 370/412 |
| 5,862,335 A | 1/1999 | Welch, Jr. et al. | 709/224 |
| 5,875,175 A | 2/1999 | Sherer et al. | 370/230 |
| 5,901,147 A | 5/1999 | Joffe | 370/412 |
| 5,936,939 A * | 8/1999 | Des Jardins et al. | 370/229 |
| 6,252,848 B1 * | 6/2001 | Skirmont | 370/229 |
| 6,333,917 B1 * | 12/2001 | Lyon et al. | 370/236 |
| 6,359,862 B1 * | 3/2002 | Jeffries et al. | 370/232 |
| 6,404,768 B1 * | 6/2002 | Basak et al. | 370/395.7 |
| 6,408,005 B1 * | 6/2002 | Fan et al. | 370/412 |
| 6,438,138 B1 * | 8/2002 | Kamiya | 370/468 |
| 6,487,198 B1 * | 11/2002 | Pierson, Jr. | 370/356 |
| 2002/0057650 A1 * | 5/2002 | Chuah et al. | 370/232 |

FOREIGN PATENT DOCUMENTS

| | | | |
|---|---|---|---|
| WO | 9826628 | 6/1998 | H04Q/11/01 |
| WO | WO 01/39467 A1 | 5/2001 | H04L/29/06 |

OTHER PUBLICATIONS

XP 000622960 "Analysis of Rate–Based Congestion Control Algorithms For ATM Networks. Part 2: Initial Transient State Analysis" Singapore, Nov. 14–16, 1995, New York, IEEE, US, Nov. 14, 1995, pp. 1095–1101, ISBN:0–7803–2510–9abstract.
XP002161812 "BLUE: A New Class of Active Queue Management Algorithms" Apr. 30, 1999 pp. 1, 5, 9, 15, 25.
International Search Report–PCT–Mar. 19, 2001.

* cited by examiner

*Primary Examiner*—Brian Nguyen
(74) *Attorney, Agent, or Firm*—Sawyer Law Group LLP

(57) ABSTRACT

A method and system for controlling a flow of a plurality of packets in a computer network is disclosed. The computer network includes a queue. The method and system include determining a queue level for the queue and determining an offered rate of the plurality of packets to the queue. The method and system also include controlling a transmission fraction of the plurality of packets to the queue, based on the queue level, the offered rate and a previous value of the transmission fraction so that the transmission fraction and the queue level are critically damped if the queue level is between at least a first queue level and a second queue level.

18 Claims, 6 Drawing Sheets

METHOD AND SYSTEM FOR CONTROLLING TRANSMISSION OF PACKETS IN COMPUTER NETWORKS

CROSS-REFERENCE TO RELATED APPLICATIONS

The present invention is related to U.S. patent application Ser. No. 09/384,691, filed Aug. 27, 1999, entitled "NETWORK PROCESSING COMPLEX AND METHODS" and assigned to the assignee of the present application. The present invention is also related to U.S. patent application Ser. No. 09/448,190 filed on Nov. 23, 1999, entitled-"METHOD AND SYSTEM FOR PROVIDING OPTIMAL DISCARD FRACTION" and assigned to the assignee of the present application.

FIELD OF THE INVENTION

The present invention relates to computer networks, and more particularly to a method and system for controlling discarding and, therefore, transmission of data packets in a computer network.

BACKGROUND OF THE INVENTION

Driven by increasing usage of a variety of network applications, such as those involving the Internet, computer networks are of increasing interest. In order to couple portions of a network together or to couple networks, switches are often used. For example, FIG. 1A depicts a simplified block diagram of a switch 10 which may be used in a computer network. The switch 10 couples hosts (not shown) connected with ports A 12 with those hosts (not shown) connected with ports B 36. The switch 10 performs various functions including classification of data packets provided to the switch 10, transmission of data packets across the switch 10 and reassembly of packets. These functions are provided by the classifier 18, the switch fabric 24 and the reassembler 30, respectively. The classifier 18 classifies packets which are provided to it and breaks each packet up into convenient-sized portions, which will be termed cells. The switch fabric 24 is a matrix of connections through which the cells are transmitted on their way through the switch 10. The reassembler 30 reassembles the cells into the appropriate packets. The packets can then be provided to the appropriate port of the ports B 36, and output to the destination hosts.

Due to bottlenecks in transferring traffic across the switch 10, data packets may be required to wait prior to execution of the classification, transmission and reassembly functions. As a result, queues 16, 22, 28 and 34 may be provided. Coupled to the queues 16, 22, 28 and 34 are enqueuing mechanisms 14, 20, 26 and 32. The enqueuing mechanisms 14, 20, 26 and 30 place the packets or cells into the corresponding queues 16, 22, 28 and 34 and can provide a notification which is sent back to the host from which the packet originated.

Although the queues 16, 22, 28 and 34 are depicted separately, one of ordinary skill in the art will readily realize that some or all of the queues 16, 22, 28 and 34 may be part of the same physical memory resource. FIG. 1B depicts one such switch 10'. Many of the components of the switch 10' are analogous to components of the switch 10. Such components are, therefore, labeled similarly. For example, the ports A 12' in the switch 10' correspond to the ports A 12 in the switch 10. In the switch 10', the queue 16 and the queue 22 share a single memory resource 19. Similarly, the queue 28 and the queue 34 are part of another single memory resource 31. Thus, in the switch 10', the queues 16, 22, 28 and 34 are logical queues partitioned from the memory resources 19 and 31.

Conventional methods have been developed in order to control traffic flowing through the switch 10 or 10', thereby improving performance of the network in which the switch 10 or 10' is used. In particular, a conventional method known as RED (random early discard or detection) is used. FIG. 2 depicts the conventional method 50 used in RED. The conventional method 50 is typically used by one of the enqueuing mechanisms 14, 20, 26, 32, 14', 20', 26' and 32' to control the traffic through the corresponding queue 16, 22, 28, 34, 16', 22', 28' and 34' respectively For the purposes of clarity, the method 50 will be explained with reference to the enqueuing mechanism 14 and the queue 16.

At the end of a short period of time, known as an epoch, a queue level of the queue 16 for the epoch is determined by the enqueuing mechanism 14, via step 52. Note that the queue level determined could be an average queue level for the epoch. In addition, the queue level determined could be the total level for the memory resource of which the queue 16 is a part. It is then determined if the queue level is above a minimum threshold, via step 54. If the queue level is not above the minimum threshold, then a conventional transmission fraction is set to one, via step 56. Step 56, therefore, also sets the conventional discard fraction to be zero. The transmission fraction determines the fraction of packets that will be transmitted in the next epoch. The conventional discard fraction determines the fraction of packets that will be dropped. The conventional discard fraction is, therefore, equal to one minus the conventional transmission fraction. A transmission fraction of one thus indicates that all packets should be transmitted and none should be dropped.

If it is determined in step 54 that the queue level is above the minimum threshold, then it is determined whether the queue level for the epoch is above a maximum threshold, via step 58. If the queue level is above the maximum threshold, then the conventional transmission fraction is set to zero and the conventional discard fraction set to one, via step 60. If the queue level is not above the maximum threshold, then the conventional discard fraction is set to be proportional to the queue level of the previous epoch divided by a maximum possible queue level or, alternatively, to some other linear function of the queue level, via step 62. Thus, the conventional discard fraction is proportional to the fraction of the queue 16 that is occupied or some other linear function of the queue level. In step 62, therefore, the conventional transmission is also set to be proportional to one minus the conventional discard fraction. The conventional transmission fraction and the conventional discard fraction set in step 56, 60 or 62 are then utilized for the next epoch to randomly discard packets, via step 64. Thus, when the queue level is below the minimum threshold, all packets will be transmitted by the enqueuing mechanism 14 to the queue 16 during the next epoch. When the queue level is above a maximum threshold, then all packets will be discarded by the enqueuing mechanism 14 during the next epoch or enqueued to a discard queue. When the queue level is between the minimum threshold and the maximum threshold, then the fraction of packets discarded by the enqueuing mechanism 14 is proportional to the fraction of the queue 16 that is occupied or some other linear function of the queue level. Thus, the higher the queue level, the higher the fraction of packets discarded. In addition, a notification may be provided to the sender of discarded packets, which causes the-sender to suspend sending additional packets for a period of time. The individual packets which are selected for discarding may also be randomly selected. For example, for each packet, the enqueuing mechanism 14 may generate a random number between zero and one. The random number is compared to the conventional discard fraction. If the random number is less than or equal to the conventional discard fraction, then the packet is dropped. Otherwise, the packet is transmitted to the queue 16. This process of discarding packets based on the transmission fraction is continued until it is determined that the epoch has ended, via step 66. When the epoch ends, the method 50 commences again in step 52 to determine the conventional transmission fraction for the next epoch and drop packets in accordance with the conventional transmission fraction during the next epoch.

Because packets can be discarded based on the queue level, the method 50 allows some control over the traffic through the switch 10 or 10'. As a result, fewer packets may be dropped due to droptail than in a switch which does not have any mechanism for discarding packets before the queue 16 becomes full. Droptail occurs when packets must be dropped because a queue is full. As a result, there is no opportunity to account for the packet's priority in determining whether to drop the packet. Furthermore, in some situations, the method 50 can reduce the synchronization of hosts sending packets to the switch 10 or 10'. This occurs because packets may be dropped randomly, based on the conventional transmission fraction, rather than dropping all packets when the queue level is at or near the maximum queue level. Performance of the switch 10 and 10' is thus improved over a switch that does not utilize RED, that is, a switch that simply drops next arriving packets when its buffer resources are depleted.

Although the method 50 improves the operation of the switches 10 and 10', one of 20 ordinary skill in the art will readily realize that in many situations, the method 50 fails to adequately control traffic through the switch 10 or 10'. Despite the fact that packets, or cells, may be dropped before the queue becomes full, the hosts tend to become synchronized in some situations. This is particularly true for moderate or higher levels of congestion of traffic in the switch 10 or 10'. The conventional transmission fraction is based on the queue level. However, the queue level may not be indicative of the state of the switch. For example, a queue level below the minimum threshold could be due to a low level of traffic in the switch 10 or 10' (a low number of packets passing through the switch 10 or 10'). However, a low queue level could also be due to a large number of discards in the previous epoch because of high traffic through the switch 10. If the low queue level is due to a low traffic level, increasing the conventional transmission fraction is appropriate. If the low queue level is due to a high discard fraction, increasing the conventional transmission fraction may be undesirable. The conventional method 50 does not distinguish between these situations. As a result, the conventional transmission fraction may be increased when it should not be. When this occurs, the queue may become rapidly filled. The transmission fraction will then be dropped, and the queue level will decrease. When the queue level decreases, the transmission fraction will increase, and the queue may become filled again. The switch 10 or 10' thus begins to oscillate between having queues full and queues empty. As a result, the average usage of the switch 10 or 10' becomes quite low and the performance of the network using the switch 10 or 10' suffers.

Accordingly, what is needed is a system and method for better controlling traffic through the switch. The present invention addresses such a need.

SUMMARY OF THE INVENTION

The present invention provides a method and system for controlling a flow of a plurality of packets in a computer network. The computer network includes a queue. The method and system comprise determining a queue level for the queue and determining an offered rate of the plurality of packets to the queue. The method and system also comprise controlling a transmission fraction of the plurality of packets to the queue, based on the queue level and the offered rate, so that the transmission fraction and the queue level are critically damped if the queue level is between at least a first queue level and a second queue level.

According to the system and method disclosed herein, the present invention provides a mechanism for providing a transmission fraction and, therefore, dropping packets so that the computer network is not only stable but also reaches equilibrium rapidly.

DETAILED DESCRIPTION OF THE INVENTION

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 2:
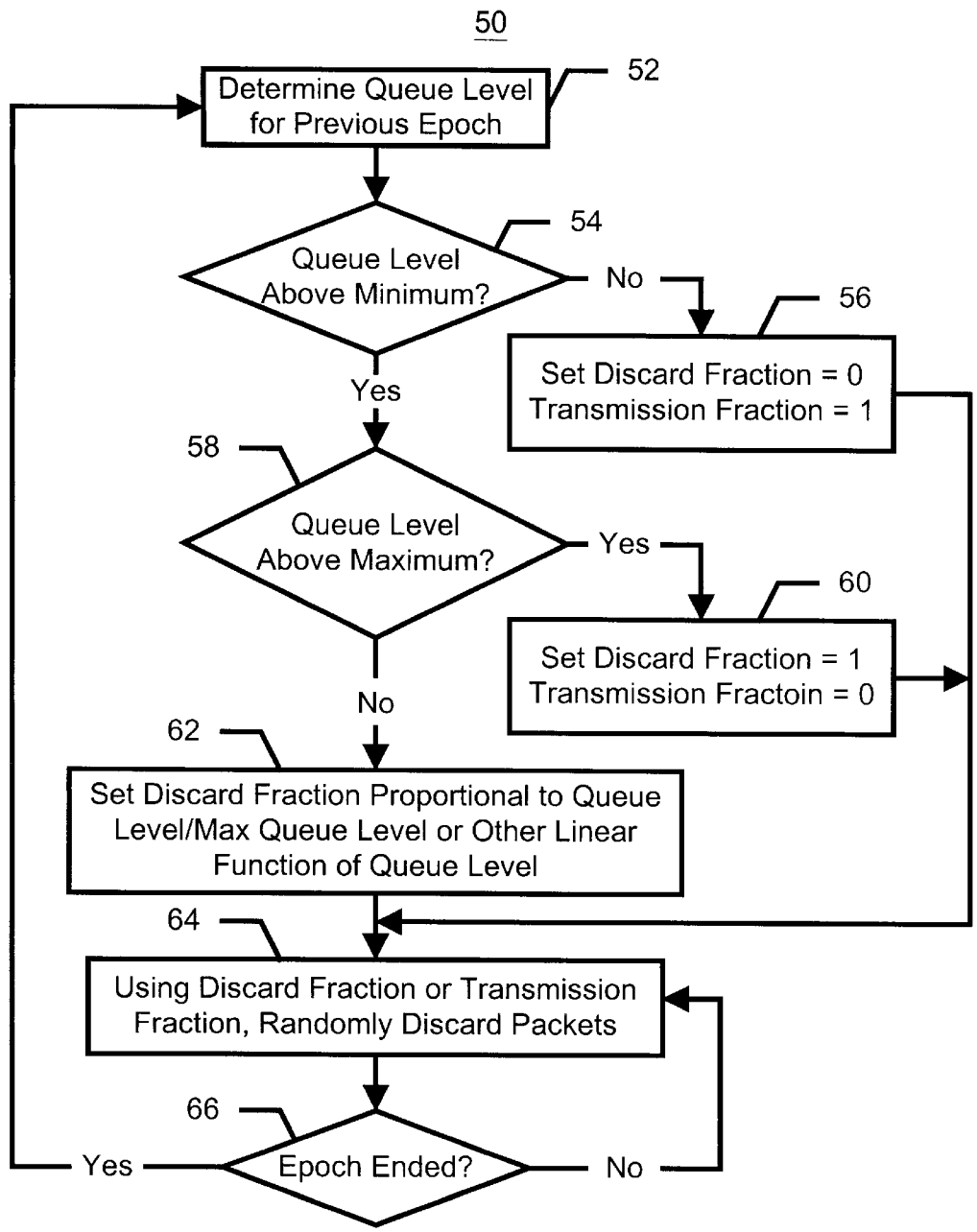
FIG. 2 is a flow chart depicting a conventional method for controlling traffic through a switch.

Switches used in computer networks typically contain queues, which may be logical queues part of the same memory resource or be separate memory resources, in which packets or smaller sized pieces of the packets, called cells, are temporarily placed. The enqueuing mechanisms which place the packets into queues may also have a mechanism for discarding packets in order to control traffic through the switch and improve operation of the network. For example, random early discard or detection (RED), described above in the method 50 of FIG. 2, discards certain packets based on the queue level. Although RED functions in certain situations, in many networks RED fails to improve network performance. For example, networks in which the switches have a moderate or high traffic amount of traffic will still be subject to oscillations. Thus, such networks may carry only a very small amount of traffic in comparison to the capacity for which such networks were designed.

Figure 3:
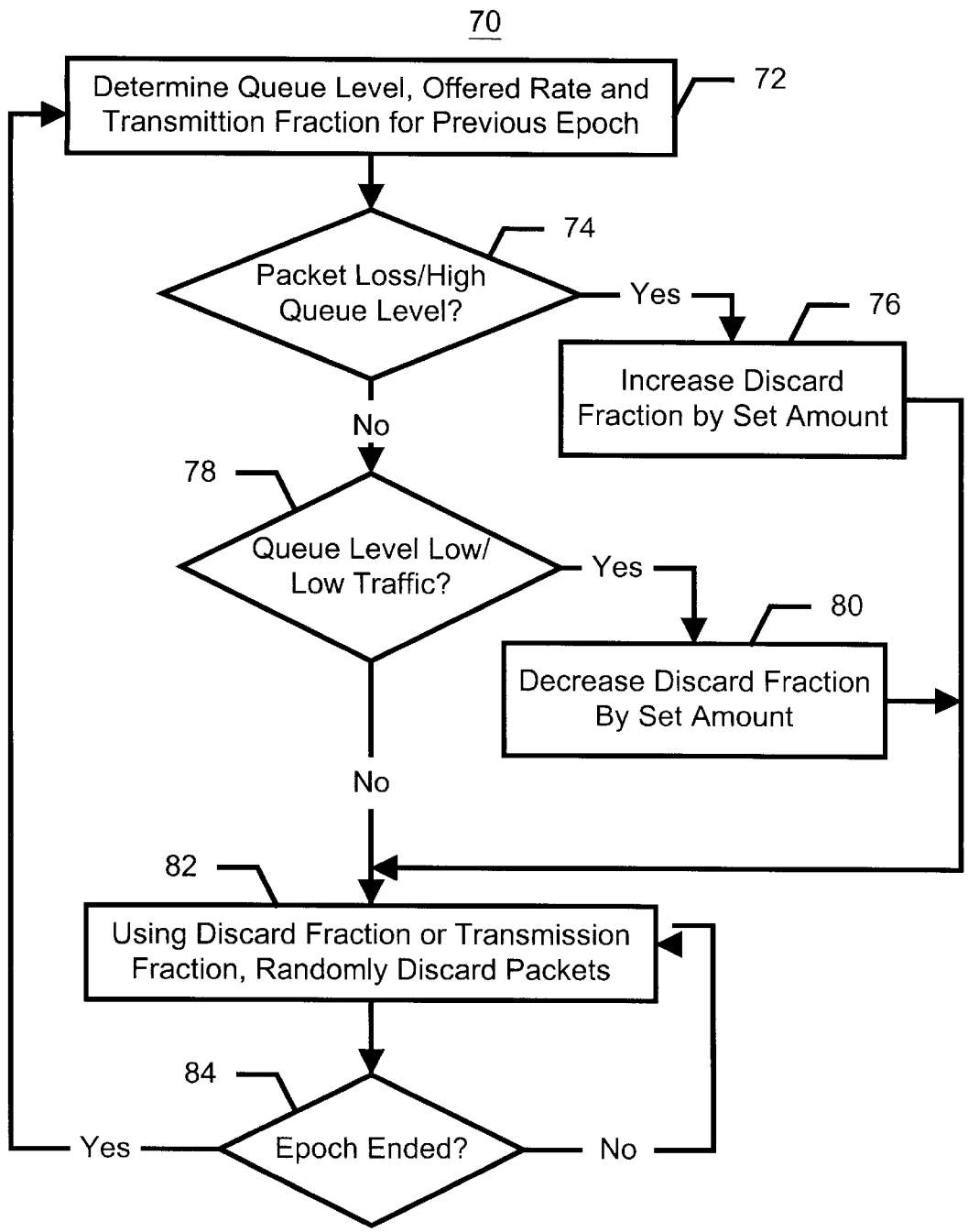
FIG. 3 is a flow chart depicting another conventional method for controlling traffic through a switch.

FIG. 3 depicts a flow chart of a more recent method 70 developed by other individuals of International Business Machines, Inc. of Armonk, N.Y. This method 70 is known as BLUE. The method 70 takes into account not only the queue level, but also the transmission rate and the offered rate. The offered rate is the rate at which packets or cells are offered to the enqueuing mechanism to be provided to the corresponding queue. The method 70 will be described using the enqueuing mechanism 14 and the queue 16. The queue level for the queue 16, the transmission fraction provided to the queue 16 by the enqueuing mechanism 14 and offered rate are determined for the epoch which just ended, via step 72. The offered rate is the rate at which packets are provided to the enqueuing mechanism 14. Thus, the offered rate could come from flows of traffic provided by one or more of the ports A 12.

It is then determined whether there is a packet loss or a queue level greater than some threshold, via step 74 Either event indicates that the discard fraction should be increased. If so, then the discard fraction is incremented by a first constant amount that may be empirically determined, via step 76. Thus, in step 76 the transmission fraction, which is one minus the discard fraction, is decreased. If it is determined in step 74 that the discard fraction should not be increased, then it is determined whether the discard fraction should be decreased, via step 78. The discard fraction should be decreased if the queue level is low or the offered rate is low. If the discard fraction should be decreased, then this is accomplished by subtracting a second constant amount that may also be empirically determined, via step 80. The discard fraction determined in step 76 or 78, if changed, or the old discard fraction is then used to determine the fraction of packets to be transmitted to the queue 16 during the next epoch, via step 82. Thus, in step 82 the packets may be discarded randomly or by also taking into account the each packet's priority. It is thus ensured that the correct discard fraction and, therefore, the correct transmission fraction are maintained. It is then 20 determined whether the epoch has ended, via step 84. If so, step 72 is returned to. Otherwise, the method 70 repeats commencing at step 84. For further details on BLUE, the website http://www.eecs.umich.edu/usuchang/blue/ can be consulted.

Although the method 70 (BLUE) works well for its intended purpose and is an improvement over the conventional method 50 (RED), one of ordinary skill in the art will readily realize that the method 70 may take a relatively long time to reach a stable state. Thus, although performance is improved over the conventional method 50, performance of the network may still be poorer than what is desired.

The present invention provides a method and system for controlling a flow of a plurality of packets in a computer network. The computer network includes a queue. The method and system comprise determining a queue level for the queue and determining an offered rate of the plurality of packets to the queue. The method and system also comprise controlling a transmission fraction of the plurality of packets to the queue. The transmission fraction is controlled based on the queue level and the offered rate so that the transmission fraction and the queue level are critically damped if the queue level is between at least a first queue level and a second queue level.

The present invention will be described in terms of a particular system and particular components. However, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues part of a single memory resource or when the queues are part of separate memory resources. The present invention is also described in the context of critical damping of the system. One of ordinary skill in the art will readily recognize, however, that the present invention generally operates over epochs. Thus, the damping provided may not be instantaneous critical damping at each instant of operation. The present invention will also be discussed in terms of packets and queues which are used prior to performing specific operations. However, one of ordinary skill in the art will readily realize that the method and system operate effectively for other pieces of traffic, such as cells, other queues, and prior to performing other operations. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmission fraction is analogous control of a rate at which packets are offered, for example by one or more sources.

Figure 4:
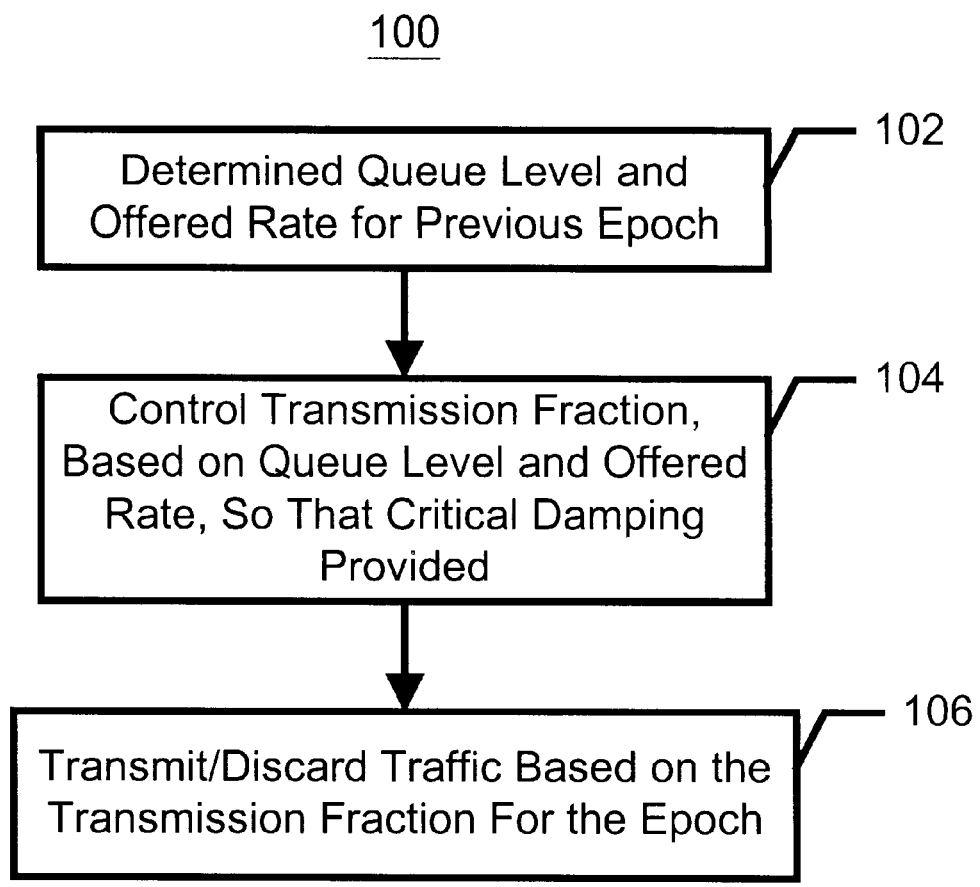
FIG. 4 is a flow chart depicting a method in accordance with the present invention for controlling traffic through a switch.

To more particularly illustrate the method and system in accordance with the present invention, refer now to FIG. 4, depicting one embodiment of a method 100 in accordance with the present invention. The method 100 is preferably accomplished using the apparatus disclosed in U.S. patent application Ser. No. 09/384,691, filed Aug. 27, 1999, entitled "NETWORK PROCESSING COMPLEX AND METHODS" and assigned to the assignee of the present application. Applicants hereby incorporate by reference the above-mentioned co-pending U.S. Patent Application. The method 100 can be used with the switch 10 or 10' shown in FIGS. 1A and 1B. For the purposes of clarity, the method 100 will be explained in conjunction with the queue 16 and enqueuing mechanism 14 depicted in FIG. 1A. However, the method 100 can be used with other queues, such as the queues 22, 28, 34, 16', 22', 28' and 34'. The method 100 can also be used with other enqueuing mechanisms, such as the enqueuing mechanisms 20, 26, 32, 14', 20', 26' and 32'. In a preferred embodiment, the method 100 is used in a system in which multiple queues are part of the same memory resource. However, nothing prevents the method 100 from being used in another system in which each queue has a separate memory resource.

Figure 1A:
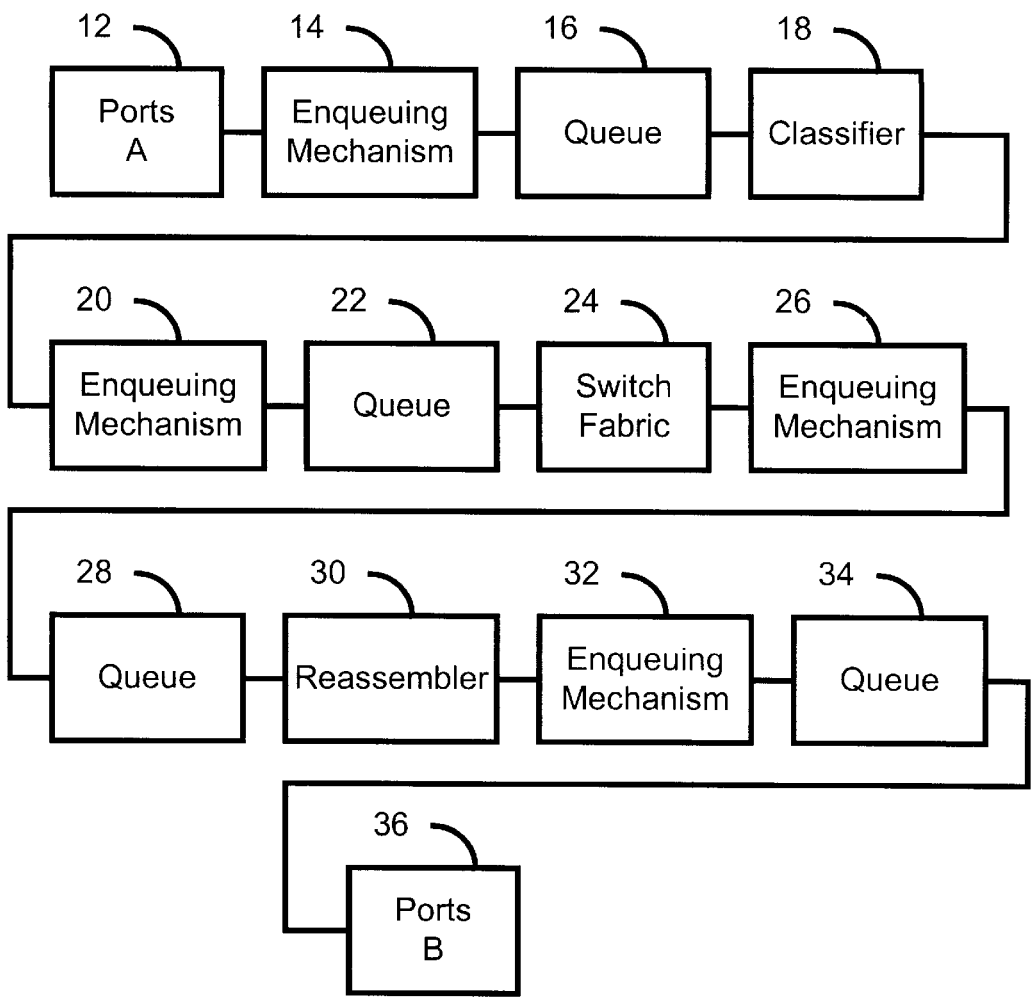
FIG. 1A is a simplified block diagram of a conventional switch.
Figure 1B:
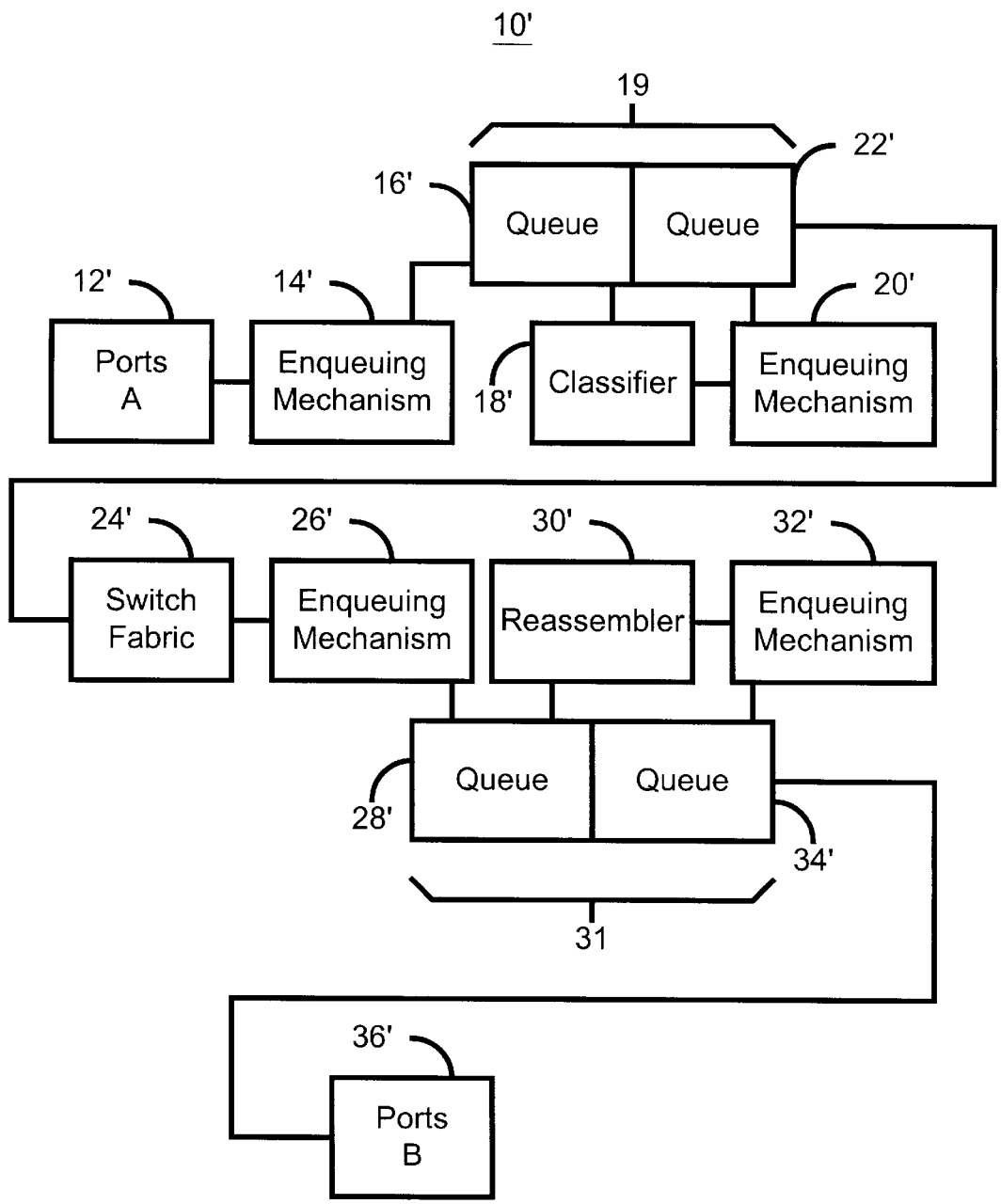
FIG. 1B a simplified block diagram of another conventional switch.

Referring to FIGS. 1A and 4, the queue level and offered rate for the prior epoch are determined, via step 102. In a preferred embodiment, the queue level is determined at the end of the previous epoch and is the level of the memory resource. Also in a preferred embodiment, the offered rate determined in step 102 is the total offered input to the memory resource during the prior epoch. In a preferred embodiment, transmission fraction for the prior epoch is also determined in step 102. In an alternate embodiment, the determination of the queue level in the method 100 includes determining the level of the queue 16 corresponding to the enqueuing mechanism 14. Also in a preferred embodiment, the transmission fraction is constant over an epoch and thus can be determined at any time during the previous epoch, but is preferably determined at the start of the previous epoch using the method 100.

The transmission fraction is then controlled so that the transmission fraction and queue level are critically damped over a range of queue levels, via step 104. The transmission fraction is controlled based on the queue level and the offered rate. In a preferred embodiment, the transmission fraction is also controlled based on the prior transmission fraction. In a preferred embodiment, step 104 calculates a change in the transmission fraction since the previous epoch in order to provide the desired transmission fraction for critical damping and adds the change in the transmission fraction to the transmission fraction for the previous epoch. The range of queue levels over which the transmission fraction is so controlled could extend over all possible queue levels. However, in a preferred embodiment, the range over which the transmission fraction is controlled for critical damping is between a minimum queue level greater than or equal to zero and a maximum queue level less or equal to than the maximum possible queue level. The transmission fraction is then used to discard packets so that the switch function is maintained, via step 106. The transmission fraction can be used to discard the appropriate fraction of packets because the transmission fraction is equal to one minus the discard fraction. As discussed above, the discard fraction is the fraction of packets to be discarded. In one embodiment, the packets are discarded randomly. However, in another embodiment, the packets are discarded based partially on the priority of the packet. Also in a preferred embodiment, discarding of a packet in step 106 also provides a notification to the sending host that the packet has been discarded. As a result, the host can temporarily suspend traffic to the switch 10.

As discussed above, the transmission fraction is controlled in step 104 to provide critical damping for the system described by the transmission fraction and the queue level. This allows the traffic through the queue 16 and, therefore, the switch 10 to rapidly reach a stable state. Because critical damping is provided, the traffic through the queue 16, as described by the queue level and the transmission fraction, should reach the stable state in a minimum amount of time. The transmission fraction required for critical damping and the relationship between the transmission fraction and the queue level can be described using stability theory as follows.

The queue level and the discard rate can be thought of as variables which describe the state of the queue 16. When the queue level increases, the discard rate should increase to prevent the queue 16 from becoming filled. However, if the discard rate increases, the queue level should decrease. Thus, the queue can be thought of as having a positive-negative feedback loop, or relationship, between the queue level and the discard rate. This relationship is what can cause oscillations in the conventional system. The present invention can be thought of as adding friction to the discard rate so that the discard rate does not change as rapidly with queue level as it does in conventional methods for controlling traffic, such as RED. As a result, oscillations can be damped or prevented.

The present invention can also be explained using stability theory. However, for simplicity the transmission rate, rather than the discard rate is used. The queue level can be described using the transmission rate, the offered rate, and the output rate. The output rate is the rate at which items are sent out of the queue or the memory resource. The change in the queue level with respect to time is given by the transmission rate multiplied by the offered rate minus the output rate. Thus, the change with respect to time of the queue level is equal to the rate at which items are input to the queue minus the rate at which items are output from the queue. In other words:

$$dQ(t)/dt = I(t)*T(t) - O(t)$$

where:

$Q(t)$ = Queue level
$I(t)$ = Rate that items (e.g. packets) are offered to enqueuing mechanism
$T(t)$ = Transmission fraction
   = (e.g.) Fraction of items offered to enqueuing mechanism transmitted to queue
$O(t)$ = Rate at which items are output from queue Also note that:

$D(t) = 1 - T(t)$ where:

$D(t)$ = the discard fraction Further, note that $Q(t)$, $I(t)$ and $O(t)$ are inherently non-negative and that $T(t)$ has values in the range $[0,1]$.

The relationship between the time rate of change of the queue level and the transmission fraction is set by the properties of the queue 16. Similarly, the relationship between the discard fraction and the transmission fraction is set by their properties. However, the transmission fraction itself can be virtually any quantity desired. Moreover, the transmission fraction can vary as desired. Thus, the transmission fraction can be set to ensure that critical damping is provided. In a preferred embodiment, the transmission fraction is chosen to be described by:

$$dT(t)/dt = \kappa(t)(\beta - \alpha T(t) - Q/Q_{max})$$

where:

$\kappa(t)$ = a number, which may depend on time $\alpha$ = a constant $\beta$ = a constant $Q_{max}$ = the maximum possible queue level
   Because there are no physical constraints imposed on the transmission fraction, other than it be between zero and one, $\kappa$, $\alpha$ and $\beta$ can be arbitrarily selected.

As discussed above, the goal for the transmission fraction is to provide critical damping, allowing the system to reach stability as rapidly as possible. For ease of explanation of critical damping, it will be assumed that the offered rate, $I(t)$, and the output rate, $O(t)$, are constant at equilibrium, the stable state. However, the analysis holds true even where $I(t)$ and $O(t)$ continue to vary, as is generally true of a network.

At equilibrium, the rate of change of the queue level with respect to time and the rate of change of the transmission with respect to time should be zero if the output rate and offered rate are constant. In other words, at equilibrium:

$$0 = I(t)*T(t) - O(t)$$
$$0 = K(t)*(\beta - \alpha T(t) - Q/Q_{max})$$
$$I(t) = I$$
$$= \text{constant}$$
$$O(t) = O$$
$$= \text{constant}$$

Consequently, at equilibrium, $T = O/I$ $\alpha*T = \beta - Q/Q_{max}$

For clarity, also assume that at minimum, $Q/Q_{max}$ is a constant, such as 0.25. It is decided that the maximum ratio of I/O that is allowed in the domain of stability is 1.6; at this I/O ratio, Q reaches $Q_{max}$ and $T = \frac{5}{8}$. Likewise, it is decided at Q less than or equal to $Q_{max}/4$ that T should be equal to one. Thus, at these two extreme equilibria:

$0 = \beta - \alpha * 5/8 - 1$ and
$0 = \beta - \alpha - 1/4$

From these assumptions, the numerical values of $\alpha$ and $\beta$ can be determined to be 2 and 2.25, respectively. Note that other tolerances for $Q/Q_{max}$ and I/O can be made to have other numerical values of $\alpha$ and $\beta$. Thus, $\alpha$ and $\beta$ can be determined based on equilibrium conditions and some assumptions about the ranges in which the switch 10 or 10' is desired to operate.

For stability, the linear approximation matrix for the queue level and transmission fraction system can be determined by taking partial derivatives. Thus, the matrix which describes the system is:

| [≠] ∂(dQ/dt)/[≠] ∂Q | [≠] ∂(dQ/dt)/[≠] ∂T | | 0 | I |
|---|---|---|---|---|
| [≠] ∂(dT/dt)/[≠] ∂Q | [≠] ∂(dT/dt)/[≠] ∂T | = | $-\kappa(t)/Q_{max}$ | $-\alpha*\kappa(t)$ |

The eigenvalues of the matrix have negative real parts. Thus, the trajectory for the system described by the queue level and transmission fraction is stable. That is, the traffic through the switch can thus be controlled to be stable over a range of levels. Furthermore, the eigenvalues are equal precisely if $K(t) = I/Q_{max}$, the condition for critical damping. From differential equations theory, critical damping is provided when the square of the trace of the matrix for the system is equal to four multiplied by the determinant. In other words: describes the system is:

$$\alpha^2 * \kappa^2(t) = 4*\kappa(t)*I/Q_{max} \text{ or}$$
$$\kappa(t) = 4*I/Q_{max}*\alpha^2)$$
$$= I(t)/Q_{max} \text{ for the assumptions made above}$$

Thus, $\kappa(t)$, $\alpha$ and $\beta$ can chosen to result in a transmission fraction that will provide critical damping in the values for which the system is desired to operate. Using the equations above, the transmission fraction desired for providing critical damping can be provided for the switch 10. For example, using the assumptions above for $Q/Q_{max}$ and I/O, the system described by the transmission fraction and the queue level are:

$Q(t+Dt) = Q(t) + [I(t)*T(t) - O(t)]*Dt$ $T(t+Dt) = T(t) + (I(t)Dt/Q_{max})(2.25 - 2*T(t) - Q(t)/Q_{max})$ where:

Dt = Time interval between calculations of Q and T
 = Time for an epoch
 $Q(t)/Q_{max}$ is greater than or equal to 0.25
 $I(t)/O(t)$ is less than or equal to 1.6

In order to account for the situations where the above conditions of Q(t), I(t) and O(t) are violated, the transmission fraction can be changed based on the queue level. For example, the transmission fraction can be made to be one when $Q/Q_{max}$ is less than 0.25. Similarly, when $I(t)/O(t)$ is larger than 1.6, the queue will begin to fill more rapidly than desired. Consequently, the transmission fraction can be set to zero or some small value when the queue reaches a level at or near a maximum value.

As discussed above, although the above analysis was explained assuming that the offered rate, I(t), and the output rate, O(t), are constant at equilibrium, the analysis for critical damping holds when I(t) and O(t) are not constant at equilibrium. Thus, critical damping can still be provided, allowing, the transmission fraction to rapidly accommodate changes in the queue level and, therefore, the offered rate and output rate.

Figure 5:
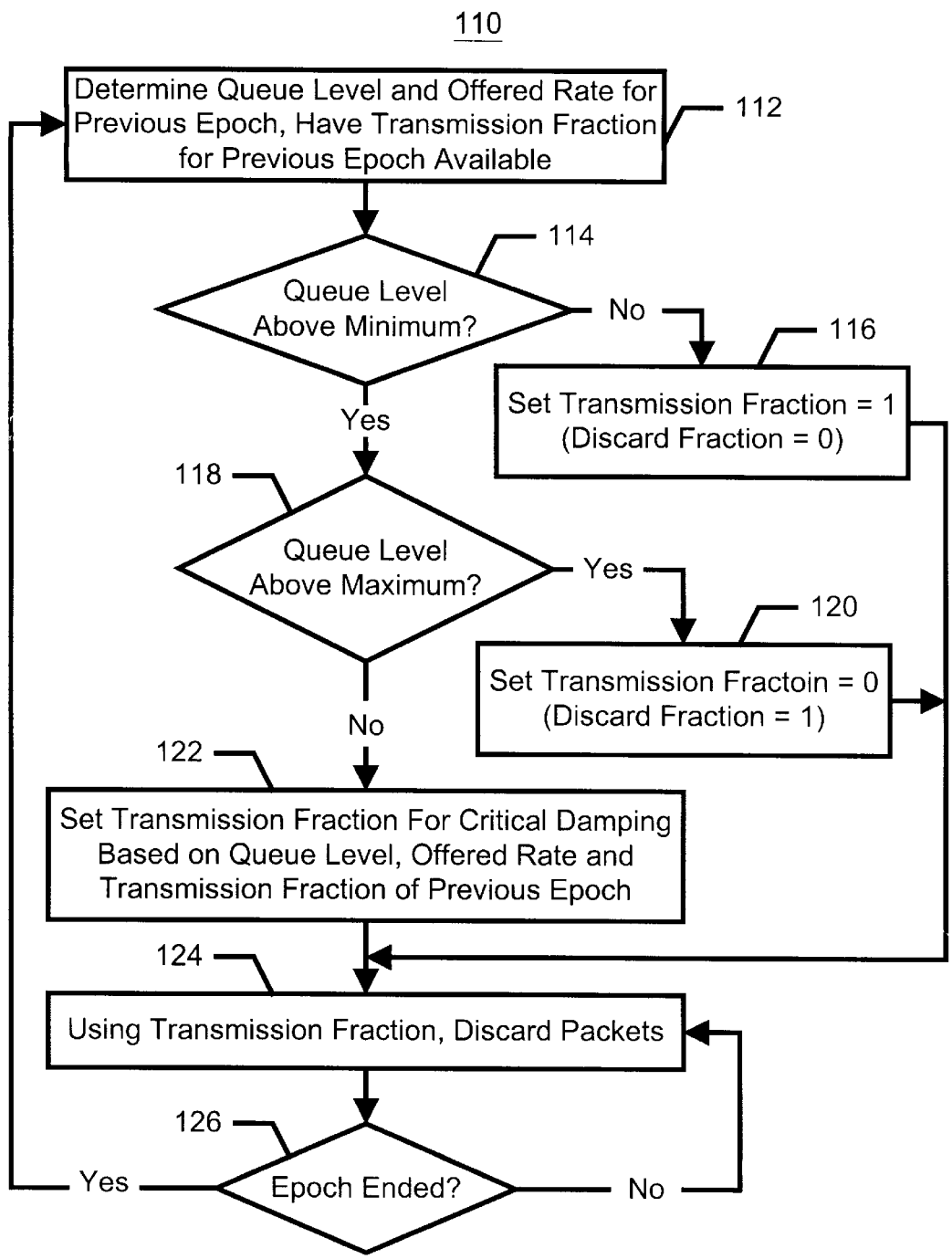
FIG. 5 is a more detailed flow chart depicting a method in accordance with the present invention for controlling traffic through a switch.

To more clearly explain the method and system in accordance with the present invention, refer to FIG. 5, which depicts a more detailed embodiment of a method 110 for controlling traffic through a switch. For clarity, the method 110 will be described in using the enqueuing mechanism 14 and the queue 16 of the switch 10. Thus, the enqueuing mechanism 14 performs the method 110. However, the method 110 could be used by another enqueuing mechanism and another switch, such as the switch 10'. Furthermore, although queue levels and offered rates to the enqueuing mechanism 14 are referred to, the queue level being determined could be for an entire memory resource and the offered rate could be for the entire memory resource.

The queue level and offered rate are determined for the previous epoch, via step 112. The queue level is preferably determined relative to a minimum queue level, $Q_{min}$, and a maximum queue level, $Q_{max}$, at the end of the epoch. The transmission fraction for the previous epoch is also available in step 112. Generally, the transmission fraction will have been determined using the method 110 and thus will be readily available. However, the transmission fraction may be determined if not already available.

It is then determined whether the queue level is above $Q_{min}$, via step 114. If not, then the transmission fraction is set to one, via step 116. Step 116 thus ensures that all packets will be transmitted by the enqueuing mechanism 14 to the queue 16 if the queue level is low enough. If it is determined that the queue level is above $Q_{min}$ in step 114, then it is determined whether the queue level is above $Q_{max}$, via step 118. If the queue level is above $Q_{max}$, then the transmission fraction is set to zero, via step 120. Thus, step 120 ensures that all packets will be discarded if the queue level is too high.

If the queue level is neither below $Q_{min}$ nor above $Q_{max}$, then in step 122 the transmission fraction is controlled for critical damping, via step 122. In a preferred embodiment, the A transmission fraction is set using the equations discussed above. Thus, the transmission fraction is set for critical damping based on the queue level, offered rate and transmission fraction from the previous epoch, as well as the length of the epoch. Using the transmission fraction set in step 116, 120, or 122, the packets are transmitted or discarded by the enqueuing mechanism 14 so that the fraction of packets provided to the queue 16 is equal to the transmission fraction. The packets are preferably randomly discarded, in a similar manner to what is used in conventional RED, discussed above with respect to FIG. 2. However, referring back to FIG. 5, the packets can also be discarded based on their priority. Furthermore, a notification is preferably sent back to the hosts sending the discarded packets so that the hosts can temporarily suspend traffic to the switch 10'. It is then determined whether the current epoch has completed, via step 126. This may be accomplished by determining whether a particular time has elapsed since the calculation of the transmission fraction was completed. If the epoch has not completed, then step 124 continues. If the epoch has completed, then step 112 is returned to.

Thus, the transmission fraction can be set for critical damping using the method 110 or the method 100. Preferably critical damping occurs only in a desired range of queue levels. Outside of this range, the transmission fraction is set to zero or one, depending on whether the queue level is determined to be too high or too low for a critical damping calculation. Because packets can be discarded randomly or based at least in part on their priority, synchronization of hosts sending traffic to the switch 10 or 10' can be prevented. Because critical damping is provided, the methods 100 and 110 can provide better stability for the system than the conventional method 50 (RED). The methods 100 and 110 also reach equilibrium more rapidly than the method 70 (BLUE) because critical damping is provided. Consequently, performance of a network using the switch 10 or 10' that utilize the method 100 or 110 is improved.

The improvement in performance using the method 100 or 110 can be seen experimentally. A network was modeled in which a bottleneck link existed. In addition, the network was provided with sufficient traffic such that approximately a thirty percent oversubscription was obtained. Thus, the network was purposely managed so that approximately thirty percent of the traffic would have to be discarded. During the experiment, the conventional method 50 (RED) discarded approximately two thousand frames, or packets, by droptail (due to a maximum queue level, the next packet had to be dropped). As discussed previously, discarding frames by droptail occurs when frames are discarded simply because the queue is full. Discarding by droptail is undesirable because these frames are discarded when the queue is full. Discarding packets by droptail destabilizes the network and fails to act according to the priority of packets.

In the same experiment, the present invention discarded no frames by droptail. Thus, the present invention could take into account the packets' priority when determining whether or not to perform a discard. Furthermore, the total number of frames transmitted by the present invention was higher than that of the conventional method 50. Consequently, the methods 110 and 110 can better manage traffic in a network even where there is a high oversubscription. In a preferred embodiment, the present invention operates well for oversubscription of up to at least fifty percent. As discussed above, because critical damping is provided, the methods 100 and 110 should also reach equilibrium more rapidly than the method 70 (BLUE).

The present invention is also related to U.S. patent application Ser. No. 09/448,190, filed on Nov. 23, 1999, entitled "METHOD AND SYSTEM FOR PROVIDING OPTIMAL DISCARD FRACTION" and assigned to the assignee of the present application. Applicant hereby incorporates by reference the above-mentioned co-pending applications. The present invention can be extended to networks having an even higher oversubscription.

A method and system has been disclosed for controlling traffic through a network. Software written according to the present invention is to be stored in some form of computer-readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a flow of a plurality of packets in a computer network including a queue, the method comprising the steps of (a) determining a queue level for the queue;

(b) determining an offered rate of the plurality of packets to the queue;

(c) controlling a transmission fraction of the plurality of packets to the queue, based on the queue level and the offered rate, so that the transmission fraction and the queue level are damped if the queue level is between at least a first queue level and a second queue level, wherein the transmission fraction is controlled after each of a plurality of epochs and wherein the transmission fraction controlling step (c) further includes the step of:

(c1) controlling the transmission fraction for an epoch of the plurality of epochs based on the queue level for a previous epoch, the offered rate for the previous epoch and the transmission fraction for the previous epoch such that the transmission fraction for the epoch and the queue level for the previous epoch would be damped.

2. The method of claim 1 wherein the transmissions fraction controlling step (c1) further includes the step of:

(c1) controlling the transmission fraction such that the queue level is critically damped.

3. The method of claim 1 wherein the queue further includes a hardware memory resource.

4. The method of claim 1 wherein the transmission fraction controlling step (c) further includes the step of:

(c2) dropping a portion of the plurality of packets based on the transmission fraction and a priority of each packet in the plurality of packets.

5. The method of claim 1 wherein the transmission fraction controlling step (c) further includes the steps of:

(c2) controlling the transmission fraction such that each packet of the plurality of packets is transmitted if the queue level is below a minimum threshold;

(c3) controlling the transmission fraction such that no packet or a small fraction of the plurality of packets is transmitted if the queue level is above a maximum threshold; and (c4) controlling the transmission fraction such that the transmission fraction and the queue level are critically damped if the queue level is between the minimum threshold and the maximum threshold.

6. A method for controlling a flow of a plurality of packets in a computer network including a queue, the method comprising the steps of (a) determining a queue level for the queue;

(b) determining an offered rate of the plurality of packets to the queue;

(c) controlling a transmission fraction of the plurality of packets to the queue, based on the queue level and the offered rate, so that the transmission fraction and the queue level are damped if the queue level is between at least a first queue level and a second queue level, wherein the transmission fraction controlling step (c) further includes the steps of:

(c1) setting a change in the transmission fraction with respect to time equal to a first quantity multiplied by a second quantity, the first quantity being dependent upon time, the second quantity being a first constant minus a second constant multiplied by the transmission fraction minus the queue level divided by a maximum possible queue level.

7. A computer-readable medium containing a program for controlling a flow of a plurality of packets in a computer network including a queue, the program including instructions for (a) determining a queue level for the queue;

(b) determining an offered rate of the plurality of packets to the queue;

(c) controlling a transmission fraction of the plurality of packets to the queue, based on the queue level and the offered rate, so that the transmission fraction and the queue level are damped if the queue level is between at least a first queue level and a second queue level, wherein the transmission fraction is controlled after each of a plurality of epochs and wherein the transmission fraction controlling instructions (c) further includes instructions for:

(c1) controlling the transmission fraction for an epoch of the plurality of epochs based on the queue level for a previous epoch, the offered rate for the previous epoch and the transmission fraction for the previous epoch such that the transmission fraction for the epoch and the queue level for the previous epoch would be damped.

8. The computer-readable medium of claim 7 wherein the transmissions fraction controlling instructions (c1) further includes instructions for:

(c1) controlling the transmission fraction such that the queue level is critically damped.

9. The computer-readable medium of claim 7 wherein the queue further includes a hardware memory resource.

10. The computer-readable medium of claim 7 wherein the transmission fraction controlling instructions (c) further includes instructions for:

(c2) dropping a portion of the plurality of packets based on the transmission fraction and a priority of each packet in the plurality of packets.

11. The computer-readable medium of claim 7 wherein the transmission fraction controlling instructions (c) further includes instructions for:

(c2) controlling the transmission fraction such that each packet of the plurality of packets is transmitted if the queue level is below a minimum threshold; (c3) controlling the transmission fraction such that no packet of the plurality of packets is transmitted if the queue level is above a maximum threshold; and (c4) controlling the transmission fraction such that the transmission fraction and the queue level are critically damped if the queue level is between the minimum threshold and the maximum threshold.

12. A computer-readable medium containing a program for controlling a flow of a plurality of packets in a computer network including a queue, the program including instructions for (a) determining a queue level for the queue;

(b) determining an offered rate of the plurality of packets to the queue;

(c) controlling a transmission fraction of the plurality of packets to the queue, based on the queue level and the offered rate, so that the transmission fraction and the queue level are damped if the queue level is between at least a first queue level and a second queue level, wherein the transmission fraction controlling instructions (c) further includes instructions for:

(c1) setting a change in the transmission fraction with respect to time equal to a first quantity multiplied by a second quantity, the first quantity being dependent upon time, the second to quantity being a first constant minus a second constant multiplied by the transmission fraction minus the queue level divided by a maximum possible queue level.

13. A system for controlling a flow of a plurality of packets in a computer network, the system comprising:

a queue for storing a portion of the plurality of packets;

an enqueuing mechanism, coupled with the queue, for receiving an offered rate of the plurality of packets and for controlling a transmission fraction of the plurality of packets to the queue, the transmission fraction being controlled based on a queue level for the queue and the offered rate so that the transmission fraction and the queue level are damped if the queue level is between at least a first queue level and a second queue level;

wherein the enqueuing mechanism controls the transmission fraction after each of a plurality of epochs and wherein the enqueuing mechanism controls the transmission fraction for an epoch of the plurality of epochs based on the queue level for a previous epoch, the offered rate for the previous epoch and the transmission fraction for the previous epoch such that the transmission fraction for the epoch and the queue level for the previous epoch would be damped.

14. The system of claim 13 wherein the transmission fraction is controlled to allow the queue level to be critically damped.

15. The system of claim 13 wherein the queue further includes a hardware memory resource.

16. The system of claim 13 wherein the enqueuing mechanism further drops a portion of the plurality of packets based on the transmission fraction and a priority of each packet in the plurality of packets.

17. The system of claim 13 wherein the enqueuing mechanism further controls the transmission fraction such that each packet of the plurality of packets is transmitted if the queue level is below a minimum threshold, no packet of the plurality of packets is transmitted if the queue level is above a maximum threshold, and the transmission fraction and the queue level are critically damped if the queue level is between the minimum threshold and the maximum threshold.

18. A system for controlling a flow of a plurality of packets in a computer network, the system comprising:

a queue for storing a portion of the plurality of packets;

an enqueuing mechanism, coupled with the queue, for receiving an offered rate of the plurality of packets and for controlling a transmission fraction of the plurality of packets to the queue, the transmission fraction being controlled based on a queue level for the queue and the offered rate so that the transmission fraction and the queue level are damped if the queue level is between at least a first queue level and a second queue level;

wherein the enqueuing mechanism further controls the transmission fraction by setting a change in the transmission fraction with respect to time equal to a first quantity multiplied by a second quantity, the first quantity being dependent upon time, the second quantity being a first constant minus a second constant multiplied by the transmission fraction minus the queue level divided by a maximum possible queue level.

* * * * *

UNITED STATES PATENT AND TRADEMARK OFFICE
CERTIFICATE OF CORRECTION

PATENT NO. : 6,771,652 B1
DATED : August 3, 2004
INVENTOR(S) : Metin Aydemir et al.

It is certified that error appears in the above-identified patent and that said Letters Patent is hereby corrected as shown below:

Column 3,
Line 34, after "of" delete "20".

Column 4,
Line 24, after "1B" add -- is --.

Column 5,
Line 38, after "then" delete "20".

Column 9,
Line 30, delete "describes the system is:"

Column 10,
Line 42, after "the" delete "A".

Column 13,
Lines 38, there should be a new paragraph where it starts as follows:
"(c3) controlling the transmission of fraction such that no packet of the plurality of packets is transmitted if the queue level is above a maximum threshold; and"

Signed and Sealed this

Fourth Day of January, 2005

JON W. DUDAS
*Director of the United States Patent and Trademark Office*